Nov. 27, 1928.
A. E. ANDERSON
1,693,328
AUTOMATIC RECLOSING CIRCUIT BREAKER SYSTEM
Filed June 21, 1926
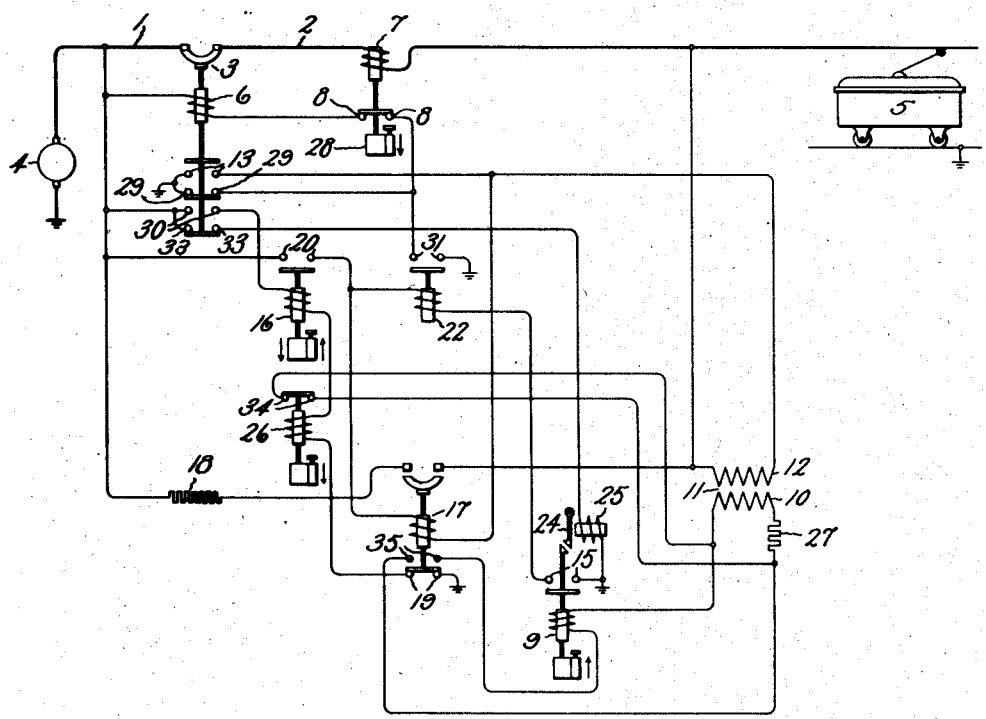
Inventor:
Arvid E. Anderson,
by
His Attorney.

Patented Nov. 27, 1928.

1,693,328

UNITED STATES PATENT OFFICE.

ARVID E. ANDERSON, OF SCOTIA, NEW YORK, ASSIGNOR TO GENERAL ELECTRIC COMPANY, A CORPORATION OF NEW YORK.

AUTOMATIC RECLOSING-CIRCUIT-BREAKER SYSTEM.

Application filed June 21, 1926. Serial No. 117,309.

My invention relates to automatic reclosing circuit breaker systems, and particularly to such systems in which the reclosing of a circuit breaker which is arranged to connect a supply circuit to a load circuit is controlled by the load connected to the load circuit.

One object of my invention is to provide an improved system for effecting the reclosing of a circuit breaker in response to a predetermined value of load resistance only when there is a useful or normal load connected to the load conductors, and will not effect the closing of the circuit breaker in response to the same value of load resistance if there is short circuit connected across the load circuit.

My invention will be better understood from the following description, taken in connection with the accompanying drawing, and its scope will be pointed out in the appended claims.

Referring to the accompanying drawing, which is a diagram of an automatic reclosing circuit breaker system embodying my invention, 1 and 2 represent conductors of two direct current circuits which are arranged to be connected together by means of a circuit breaker 3 of any suitable type. The conductors 1 and 2 may, for example, be sections of a railway circuit, the conductor 1 being part of the supply circuit which is connected to a suitable source of current 4, and the conductor 2 being part of the load circuit to which is connected a load 5. As shown in the drawing, the ground constitutes the other side of the two direct current circuits, but it is apparent that my invention is not limited to a grounded system. The load circuit may also be supplied with current from some other source, not shown, as the number of sources connected to the load circuit is immaterial so far as my invention is concerned.

As shown, the circuit breaker 3 is of the well known contactor type, the closing coil 6 of which is arranged to be de-energized in any suitable manner to effect the opening of the circuit breaker when an abnormal load condition occurs on either of the two circuits. For accomplishing this result, an overload relay 7 is provided, which is so connected and arranged that it opens its contacts 8 in the circuit of the closing coil 6 when the current through the main contacts of the circuit breaker exceeds a certain amount.

When the circuit breaker is opened due to an overload on the load circuit, the circuit breaker should remain open as long as there is either a short circuit or an excessive normal load connected to the load circuit. However, as soon as the resistance of the normal or useful load is more than a predetermined amount, it is desirable to reclose the circuit breaker automatically, but if there is a resistance load containing a relatively small amount of reactance, such as a short circuit, connected to the load circuit, it is desirable not to reclose the circuit breaker, although the resistance of the total load is more than said predetermined value. Therefore, in order to accomplish this result, it is necessary to provide suitable means for discriminating between a resistance load containing a small amount of reactance, such as a short circuit, and a useful load, such as motors and the like, which has considerable reactance. In accordance with my improved arrangement, this means which discriminates between the two kinds of load is the reclosing relay 9 which is connected across the secondary winding 10 of a transformer 11, the primary winding 12 of which is arranged to be connected across the load circuit by means of the auxiliary contacts 13 on the circuit breaker when it is open. Since the relay 9 is inductively connected across the direct current load circuit, it is only energized when the direct current voltage across the load circuit changes. Furthermore, it is evident that the energization of the relay 9 depends upon the magnitude and duration of the voltage change, and also the rate at which the voltage change takes place. When the load contains very little reactance in proportion to its resistance, and the load circuit is connected to a source of constant voltage through a relatively high constant resistance, the voltage change produced when the connection is made occurs at a very high rate and lasts for only a very short time, and the magnitude of the change increases directly with the resistance of the load circuit. The greater the proportion of the reactance for a given value of resistance, the lower the rate of change of the voltage, but the longer its duration. Furthermore, it is evident that as the load of a given power factor decreases, a greater voltage change is produced and therefore a greater voltage is induced in the secondary winding 10 of the transformer.

The relay 9 is arranged in any suitable manner, so that it does not close its contacts 15 until after its coils have been energized more than a certain amount for more than a certain length of time. Therefore, the voltage, which is induced in the secondary winding 10 of the transformer 11 by a given resistance load containing a relatively small amount of reactance, such as a short circuit, does not cause the relay 9 to close its contacts 15 because its duration is not long enough, but the voltage, which is induced by the same resistance load containing a relatively high amount of reactance, such as the normal useful load, is of sufficient duration to allow the relay 9 to close its contacts 15. However, when the useful load is more than a certain amount, the voltage induced in the secondary is not great enough to cause the relay 9 to operate and close its contacts. Therefore, the relay 9 picks up and closes its contacts 15 in response to a value of load resistance above a predetermined value when there is only a useful load, such as a motor load, connected across the load circuit, and does not pick up in response to the same value of load resistance when there is an abnormal load containing relatively little reactance connected across the load circuit.

In order to produce periodically a current change through the load circuit when the circuit breaker is open so as to produce a voltage change across the load circuit, I provide a time relay 16 which is arranged to be energized in response to the opening of the circuit breaker 3, and which completes a circuit for contactor 17 after the circuit breaker has been open for a certain length of time. The contactor 17, in closing, connects the current limiting device 18, shown as a resistor, between conductors 1 and 2, so that a limited current flows from the supply circuit to the load circuit. The contactor 17 is provided with auxiliary contacts 19, which are in the circuit of the closing coil of the time relay 16, so that when the contactor 17 is closed, the time relay 16 is deenergized. The time relay 16 is arranged in any suitable manner, examples of which are well known in the art, whereby it does not close its contacts 20 until after its coil has been energized for a certain length of time, and does not open its contacts until after the coil has been deenergized for a certain length of time. The time delay of the relay, in opening its contacts, is relatively short, being only long enough to permit the reclosing relay to effect the reclosing of the circuit breaker, whereas the time delay of the relay, in closing its contacts, is relatively long. It will be observed, therefore, that so long as the circuit breaker 1 remains open, the contactor 17 is periodically opened and closed by the operation of the relay 16 and the contactor 17.

In order to effect the reclosing of the circuit breaker 3 when the load conditions are such that the relay 9 picks up and closes its contacts 15 in response to the voltage change produced across the load circuit by the closing of the contactor 17, I provide a control relay 22 which is arranged to be energized when both the time relay contacts 20 and the reclosing relay contacts 15 are closed. The control relay 22, when energized, completes an energizing circuit for the closing coil of the circuit breaker 6.

Since the relay 9 is energized only while the voltage across the load circuit is changing, it is necessary to provide suitable means to maintain the contacts 15 of the relay closed until after the circuit breaker has been reclosed. I accomplish this result by means of a latch 24 which holds the relay contacts 15 closed after they have been closed, and a release coil 25, which is arranged to be energized to release the latch when the circuit breaker 3 is reclosed.

In order to prevent the reclosing relay 9 from being operated by voltage changes which may be produced across the load circuit at other times than when the contactor 17 is closed, it is necessary to provide suitable means for rendering the reclosing relay inoperative at such other times. In the arrangement shown in the drawing, I accomplish this result by providing a time relay 26 the coil of which is connected in series with the coil of relay 16. The relay 26, however, is arranged so that it opens its contacts 34 before relay 16 closes its contacts 20 when both relays are energized and closes its contacts 34 before relay 16 opens its contacts 20 when both relays are deenergized. The contacts 34 when closed short circuits the coil of the relay 9. In order to limit the current through this short circuit, a resistor 27 may be provided in the secondary circuit of the transformer if necessary. Also in order to insure that the relay 9 does not close its contacts 15 after relay 26 has opened its contacts 34 and before the contactor 17 has closed, the circuit of the coil 9 includes the auxiliary contacts 35 on the contactor 17 which are arranged to be closed before its main contacts are closed.

The operation of the system shown is as follows: When the circuit breaker 3 is closed and load conditions are normal, the circuit breaker 3 is maintained closed by the closing coil 6, the circuit of which is completed from conductor 1 through the coil 6, contacts 8 of the overload relay 7, auxiliary contacts 29 on the circuit breaker, to ground.

When an abnormal load condition occurs which causes the overload relay 7 to open its contacts 8, the above-traced holding circuit of the closing coil 6 is opened so that the circuit breaker opens. Since the contactor 17 is open when the circuit breaker opens, the circuit of the coil 9 is open at the auxiliary contacts 35 of the contactor, so that the relay 9 is not operated by any voltage change that may occur across the load circuit due to the opening of the circuit breaker and the closing of the auxiliary contacts 13 of the circuit breaker which connects the primary 12 across the load circuit.

When the circuit breaker 3 opens, its auxiliary contacts 30 complete a circuit for the coils of the time relays 16 and 26 from conductor 1 through contacts 30, coil of the time relay 16, coil of the time relay 26, contacts 19 on the contactor 17, to ground. After a predetermined time has elapsed, which is longer than the time it takes the overload relay 7 to be restored to its normal position, the relay 26 opens its contacts 34 and a short time afterwards the relay 16 closes its contacts 20 and completes a circuit for the closing coil of the contactor 17 from conductor 1, through contacts 20 of the time relay 16, closing coil of the contactor 17, auxiliary contacts 13 on the circuit breaker 3, to ground. The closing of the auxiliary contacts 35 on the contactor 17 completes the circuit of the relay 9 across the secondary of the transformer 11 and the closing of the main contacts of the contactor 17 connects the two conductors 1 and 2 together with the resistor 18 in series between them. The closing of the main contacts of the contactor 17, therefore, produces a voltage change across the load circuit. If there is a short circuit or an excessive amount of useful load connected across the load circuit when the contactor 17 closes, the voltage is changed such that the relay 9 does not pick up and close its contacts 15. Therefore, the control relay 22 is not energized to effect the reclosing of the circuit breaker.

Since the opening of the auxiliary contacts 19 of the contactor 17 effects the deenergization of the coils of the time relays 16 and 26, these relays, a short time after their coils are deenergized, are restored to their normal positions. The relay 26 by closing its contacts 34 reestablishes the short circuit across the secondary of the transformer 11 so that the relay 9 cannot be operated by the voltage change that is produced by the opening of the contactor 17 and the relay 16 by opening its contacts 20 opens the circuit of the coil of the contactor 17 so that the connection between the two conductors 1 and 2 is opened. As soon as the contacts 19 of the contactor 17 are closed, the coils of the time relays 16 and 26 are again energized and the above described operation is repeated until there is neither a short circuit nor an excessive amount of useful load connected across the load circuit when the contactor 17 closes.

When the load conditions are such that the change of the voltage across the load circuit produced by the closing of the contactor 17 is such as to cause the relay 9 to pick up and close its contacts 15, a circuit for the control relay 22 is completed from the conductor 1 through contacts 20 of the time relay 16, coil of relay 22, contacts 15 of the reclosing relay 9 to ground. The relay 22 closes its contacts 31, and thereby completes a circuit for the closing coil 6 of the circuit breaker 3 to close the circuit breaker, this circuit being from the conductor 1, through the closing coil 6, contacts 8 of the overload relay 7, contacts 31 of relay 22, to ground.

As pointed out above, the arrangement is such that the relay 9 operates in response to a load resistance above a predetermined value if the load contains a relatively large amount of reactance, but does not operate in response to the same value of load resistance if the load contains a relatively small amount of reactance. Furthermore, since the relay 9 has to close its contacts 15 before the circuit breaker 3 can close, the present arrangement has the advantage that the reclosing of the circuit breaker cannot be effected when the relay 9 is prevented from being energized by an open circuit in the control equipment.

The opening of the auxiliary contacts 13 on the circuit breaker, when it closes, disconnects the primary of the transformer from the load circuit and opens the circuit of the closing coil of the contactor 17. The opening of the auxiliary contacts 30 prevents the time relays 16 and 26 from being reenergized when the contacts 19 of the contactor 17 are reclosed. The closing of the auxiliary contacts 29 completes the heretofore traced holding circuit for the closing coil 6, and the closing of the auxiliary contacts 33 completes a circuit for the release coil 25 of the reclosing relay 9, across the supply circuit, so that the reclosing relay 9 is restored to its normal position.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new, and desire to secure by Letters Patent of the United States is:

1. In an automatic reclosing circuit breaker system, a supply circuit, a load circuit, a circuit breaker for connecting said circuits together, means for effecting the opening of said circuit breaker, means for producing a voltage change across said load circuit when said circuit breaker is open, and means responsive to the rate at which the voltage across said load circuit changes in response to the operation of said last mentioned means for controlling the reclosing of said circuit breaker.

2. In an automatic reclosing circuit breaker system, two circuits, a circuit breaker connecting said circuits together, means for effecting the opening of said circuit breaker upon the occurrence of a predetermined abnormal condition on one of said circuits, means for producing a voltage change across the circuit on which the abnormal condition occurred after the circuit breaker has opened, and timing means responsive to the rate at which the voltage across said load circuit changes in response to the operation of said last mentioned means for controlling the reclosing of said circuit breaker.

3. In an automatic reclosing circuit breaker system, two direct current circuits, a circuit breaker connecting said circuits together, means for effecting the opening of said circuit breaker upon the occurrence of an abnormal condition on one of said circuits, means responsive to the opening of said circuit breaker for effecting a change in the voltage across the circuit on which the abnormal condition occurred, and a relay inductively connected across the circuit on which the abnormal condition occurred after the circuit breaker opens for controlling the reclosing of said circuit breaker.

4. In an automatic reclosing circuit breaker system, two direct current circuits, a circuit breaker connecting said circuits together, means for effecting the opening of said circuit breaker upon the occurrence of an abnormal condition on one of said circuits, current limiting means, means responsive to the opening of said circuit breaker for connecting said current limiting means in series between said circuits, and a relay inductively connected across the circuit on which the abnormal condition occurs and arranged to control the reclosing of said circuit breaker.

5. In an automatic reclosing circuit breaker system, two direct current circuits, a circuit breaker connecting said circuits together, means for effecting the opening of said circuit breaker upon the occurrence of an abnormal condition on one of said circuits, current limiting means, means responsive to the opening of said circuit breaker for connecting said current limiting means in series between said circuits, a transformer, means controlled by the opening of said circuit breaker for connecting the primary winding of said transformer across the circuit on which the abnormal condition occurred, and a time relay connected across the secondary winding of said transformer for controlling the reclosing of said circuit breaker.

6. In an automatic reclosing circuit breaker system, a supply circuit, a load circuit, a circuit breaker connecting said circuits together, means for opening said circuit breaker, means for periodically producing changes in the voltage impressed on said load circuit when the circuit breaker is open, and timing means controlled by the voltage change produced across said load circuit by the operation of said last mentioned means for controlling the reclosing of said circuit breaker.

7. In an automatic reclosing circuit breaker system, a supply circuit, a load circuit, a circuit breaker connecting said circuits together, means for opening said circuit breaker, means for periodically producing changes in the voltages impressed on said load circuit when the circuit breaker is open, means for effecting the reclosing of said circuit breaker, a transformer having its primary winding connected across said load circuit when said circuit breaker is open, and a relay connected across the secondary winding of said transformer and arranged to control said voltage changing means and said reclosing means.

8. In an automatic reclosing circuit breaker system, two direct current circuits, a circuit breaker connecting said circuits together, overload responsive means for effecting the opening of said circuit breaker upon the occurrence of a predetermined overload condition on one of said circuits, means for producing a voltage change across the circuit on which the abnormal condition occurred, a transformer arranged to have its primary winding connected across said one of said circuits when the circuit breaker is open, a relay connected across the secondary winding of said transformer and arranged to control the reclosing of said circuit breaker, and means for rendering said reclosing relay inoperative for a certain length of time after the circuit breaker opens.

9. In an automatic reclosing circuit breaker system, two direct current circuits, a circuit breaker connecting said circuits together, overload responsive means for effecting the opening of said circuit breaker upon the occurrence of a predetermined overload condition on one of said circuits, means for producing a voltage change across the circuit on which the abnormal condition occurred, a transformer arranged to have its primary winding connected across said one of said circuits when the circuit breaker is open, a relay connected across the secondary winding of said transformer and arranged to control the reclosing of said circuit breaker, and means for rendering said relay inoperative during the opening of said circuit breaker and for a certain length of time after the circuit breaker opens.

10. In an automatic reclosing circuit breaker system, two direct current circuits, a circuit breaker connecting said circuits together, overload responsive means for effecting the opening of said circuit breaker upon the occurrence of a predetermined overload condition on one of said circuits, means for producing a voltage change across the circuit on which the abnormal condition occurred, a transformer arranged to have its primary winding connected across said one of said circuits when the circuit breaker is open, a relay connected across the secondary winding of said transformer and arranged to control the reclosing of said circuit breaker, and means controlled by said voltage change producing means for controlling the circuit of said relay.

11. In an automatic reclosing circuit breaker system, a direct current supply circuit, a direct current load circuit, a circuit breaker connecting said circuits together, overload responsive means for effecting the opening of said circuit breaker, means responsive to the opening of said circuit breaker for periodically connecting and disconnecting said circuits, a reclosing relay inductively connected across said load circuit for effecting the reclosure of said circuit breaker, and locking means for said reclosing relay controlled by the position of said circuit breaker.

In witness whereof, I have hereunto set my hand this 18th day of June, 1926.

ARVID E. ANDERSON.